United States Patent
Uchida et al.

(10) Patent No.: US 10,213,874 B2
(45) Date of Patent: Feb. 26, 2019

(54) DOUBLE SIDED WELDING METHOD

(75) Inventors: Keisuke Uchida, Nagoya (JP); Shingo Iwatani, Nisshin (JP); Takahito Endo, Toyota (JP); Go Kuramoto, Toyokawa (JP); Jun Kamitake, Toyota (JP); Shuhei Yamaguchi, Kariya (JP)

(73) Assignees: AISIN SEIKI KABUSHIKI KAISHA, Kariya-shi (JP); TOYOTA JIDOSHA KABUSHIKI KAISHA, Toyota-shi (JP)

( * ) Notice: Subject to any disclaimer, the term of this patent is extended or adjusted under 35 U.S.C. 154(b) by 1363 days.

(21) Appl. No.: 13/981,379

(22) PCT Filed: Apr. 8, 2011

(86) PCT No.: PCT/JP2011/058873
§ 371 (c)(1),
(2), (4) Date: Jul. 24, 2013

(87) PCT Pub. No.: WO2012/137342
PCT Pub. Date: Oct. 11, 2012

(65) Prior Publication Data
US 2013/0299469 A1    Nov. 14, 2013

(51) Int. Cl.
B23K 26/30    (2014.01)
B23K 26/06    (2014.01)
(Continued)

(52) U.S. Cl.
CPC .......... B23K 26/30 (2013.01); B23K 26/0626 (2013.01); B23K 26/24 (2013.01);
(Continued)

(58) Field of Classification Search
CPC .............. B23K 2201/008; B23K 26/30; B23K 26/0626; B23K 26/24; B23K 26/28;
(Continued)

(56) References Cited

U.S. PATENT DOCUMENTS 6,717,098 B2 *  4/2004  Matsushita ............ B23K 26/03
                                                         219/121.63
7,006,958 B2 *  2/2006  Crilly .................... B23K 9/095
                                                              700/30
(Continued)

FOREIGN PATENT DOCUMENTS

DE    102009001986 A1    10/2010
JP    06-109085 A    4/1994
(Continued)

OTHER PUBLICATIONS

Toyota Technical Publications (Publication No. 22374), Feb. 26, 2010, "Laser Welding Method," 7 pages with English translation.

*Primary Examiner* — Dana Ross
*Assistant Examiner* — James Sims, III
(74) *Attorney, Agent, or Firm* — Hunton Andrews Kurth LLP

(57) ABSTRACT

A double side welding method used for producing a differential gear for welding a weld part to join a ring gear fitted on a gear case from both sides. The method uses welding distortion caused by welding to improve product accuracy. The method includes welding from both sides of a weld part where a first member and a second member, which are the objects being joined, face each other. The method is performed by first welding, which is performed from one side, and second welding, which is performed from the other opposite side from that first welding. Heat quantity adjustment, that adjusts the quantity of heat input to the weld part for the second welding, is performed after the first welding, and is carried out such that an amount of welding distortion that is the objective arises.

12 Claims, 9 Drawing Sheets

(51) Int. Cl.
 *B23K 26/24* (2014.01)
 *B23K 26/28* (2014.01)
 *B23K 31/00* (2006.01)
 *B23K 33/00* (2006.01)
 *F16H 55/17* (2006.01)
 *B23K 101/00* (2006.01)

(52) U.S. Cl.
 CPC ............ *B23K 26/28* (2013.01); *B23K 31/003* (2013.01); *B23K 33/006* (2013.01); *B23K 2101/008* (2018.08); *F16H 55/17* (2013.01)

(58) Field of Classification Search
 CPC .. B23K 31/003; B23K 33/006; B23K 31/125; G05B 2219/45138
 USPC ................ 219/121.64, 124.22, 136; 403/270
 See application file for complete search history.

(56) References Cited

U.S. PATENT DOCUMENTS

| | | | |
|---|---|---|---|
| 2006/0213878 A1* | 9/2006 | Namiki | B23K 26/03 219/121.63 |
| 2009/0120919 A1* | 5/2009 | O'Donnell | B23K 9/188 219/130.1 |
| 2010/0001044 A1 | 1/2010 | Weibling et al. | |
| 2012/0061357 A1 | 3/2012 | Ramsayer et al. | |
| 2012/0094798 A1 | 4/2012 | Uchida et al. | |
| 2012/0295125 A1 | 11/2012 | Uchida et al. | |

FOREIGN PATENT DOCUMENTS

| | | |
|---|---|---|
| JP | H08174224 A | 7/1996 |
| JP | 10-231918 A | 9/1998 |
| JP | 2005088048 A | 4/2005 |
| JP | 2007-260691 A | 10/2007 |
| JP | 2008-200740 A | 9/2008 |
| JP | 2011-000624 A | 6/2009 |
| KR | 10-0826589 B1 | 4/2008 |
| WO | 2011/089704 A1 | 7/2011 |
| WO | 2011/089706 A1 | 7/2011 |

* cited by examiner

DOUBLE SIDED WELDING METHOD

This is a 371 national phase application of PCT/JP2011/058873 filed 08 Apr. 2011, the contents of which are incorporated herein by reference.

TECHNICAL FIELD

The present invention relates to a double side welding method, which is a welding method to be used for producing a differential gear for example, to weld a weld part to join a ring gear fitted on a gear case from both sides, and particularly relates to a double side welding method positively utilizing welding distortion caused by welding to improve product accuracy.

BACKGROUND ART

Conventionally, when a ring gear is to be joined to a gear case of a differential gear, bolts are used to fasten them. However, such bolt fastening would cause problems with an increase in weight due to the weight of bolts and the weight of flanges placed to overlap each other, and further with an increase in machining cost due to the necessity of tapping process and hole-forming process.

Therefore, Patent Documents 1 and 2 listed below disclose other joining methods. Patent Document 1 discloses a joining method in which a gear case and a ring gear constituting a differential gear are placed to overlap one on the other, and a soldering material is interposed on their joint surfaces to join them. To be concrete, in this joining method, while the ring gear is pressed against the gear case, a current is applied to electrodes placed in contact with the gear case and the ring gear, and heat generated by contact resistance between the joint surfaces melts and diffuses the soldering material. Patent Document 2 discloses a laser welding performed by placing an outer peripheral end portion of a flange member in contact with an inner periphery of a ring gear. Specifically, the ring gear is fitted on the flange member and a laser beam is irradiated to a weld part, which corresponds to their peripheral surfaces contacting with each other, from both sides in an axial direction of the ring gear.

RELATED ART DOCUMENTS

Patent Documents

Patent Document 1: JP 06 (1994)-109085 A
Patent Document 2: JP 10 (1998)-231918 A

SUMMARY OF INVENTION

Problems to be Solved by the Invention

The joining method of Patent Document 1 has the following problems. There is a case where sufficient joining strength could not be obtained by the joining using the soldering material. The weld part of the ring gear is annular, but the electrodes could not be arranged uniformly over its entire circumference. Accordingly, the entire weld part could not be uniformly soldered by heat, causing welding distortion whereby tooth-surface accuracy is deteriorated. Furthermore, the ring gear is heated during joining and thus is softened by tempering. This induces a decrease in hardness of tooth surface. On the other hand, the laser welding method disclosed in Patent Document 2 enables high-speed welding and needs less heat input amount, which is thus a joining method more effective than the method of Patent Document 1. However, even though the laser welding causes less heat influence, welding distortion is generated. Therefore, further improvement of product accuracy such as tooth-surface accuracy has been demanded.

The present invention has a purpose to provide a double side welding method capable of improving product accuracy.

Means of Solving the Problems

To achieve the above purpose, one aspect of the invention provides a double side welding method for joining a first member and a second member being abutted against each other in a weld part, the method including first welding to be performed from one side with respect to the weld part and second welding to be performed from the other side, wherein the second welding to be performed after the first welding includes heat amount adjustment to adjust a heat input amount with respect to the weld part so that welding distortion corresponding to a target distortion amount is generated.

In the above double side welding method, preferably, the first welding and the second welding both include the heat amount adjustment to adjust the heat input amount to the weld part so that the welding distortion corresponding to the target distortion amount is generated.

In the above double side welding method, preferably, the heat amount adjustment includes: preparing a first test member and a second test member respectively identical to the first member and the second member; determining the target distortion amount based on a result of welding distortion due to the first welding and the second welding performed on the first and second test members; and adjusting the heat input amount to the weld part to generate the welding distortion corresponding to the determined distortion amount.

In the above double side welding method, preferably, when the welding distortion is targeted for the second member, in performing one or both of the first welding and the second welding, the heat amount adjustment includes: measuring a state of the second member before welding is measured; determining the target distortion amount based on a measurement result; and adjusting the heat input amount to the weld part to generate the welding distortion corresponding to the determined distortion amount.

In the above double side welding method, preferably, when the welding distortion is targeted for the second member, and the first welding and the second welding each include temporary welding before main welding, in performing the main welding of one or both of the first welding and the second welding after the temporary welding, the heat amount adjustment includes: measuring a state of the second member before welding; determining the target distortion amount based on a measurement result; and adjusting the heat input amount to the weld to generate the welding distortion corresponding to the determined distortion amount.

In the above double side welding method, preferably, the first member is a member provided with a circular protruding portion, the second member is an annular member in which the protruding portion is fitted, and peripheral surfaces of the first member and the second member in fitting relation are in abutting relation in a radial direction, forming the weld part.

In the above double side welding method, preferably, the state measurement in the heat amount adjustment is performed on a state of an end face of the second member in an axial direction before welding over entire circumference.

In the above double side welding method, preferably, the first welding and the second welding are laser welding.

Another aspect of the invention provides a double side welding method for joining a first member provided with a circular protruding portion and an annular second member fitted on the protruding portion so that peripheral surfaces of the first member and the second member are in abutting relation in a radial direction, forming the weld part, the method including first welding to be performed from one side with respect to the weld part and second welding to be performed from the other side, wherein, in performing one or both of the first welding and the second welding, a welding start position in a circumferential direction is determined so that a welding displacement in the circumferential direction generated by welding distortion cancels out circumferential undulation existing in an end face of the second member in an axial direction.

In the above double side welding method, preferably, the method includes: preparing a first test member and a second test member respectively identical to the first member and the second member; measuring a state of the end face of the second test member in the axial direction after one or both of the first welding and the second welding performed on the first and second test members; and determining in advance the welding displacement generated by the welding distortion in the end face of the second test member in the axial direction based on a measurement result of the state of the end face, wherein the state of the end face of the second member in the axial direction is measured before one or both of the first welding and the second welding are performed on the first member and the second member, and the undulation existing in the end face in the axial direction before welding is calculated, and in performing one or both of the first welding and the second welding, a welding start position in a circumferential direction so that the welding displacement cancels out the undulation.

In the above double side welding method, preferably, the method includes: preparing a first test member and a second test member respectively identical to the first member and the second member; and determining in advance the welding displacement based on a measurement result of the state of the end face of the second test member in the axial direction after both of the first welding and the second welding are performed on the first and second test members, wherein the undulation of the second member is calculated before both of the first welding and the second welding are performed on the first member and the second member, and in performing when both of the first welding and the second welding, the welding start position in the circumferential direction is determined so that the welding displacement cancels out the undulation.

In the above double side welding method, preferably, the method includes: preparing a first test member and a second test member respectively identical to the first member and the second member; and determining in advance the welding displacement based on a measurement result of the state of the end face of the second test member in the axial direction by the second welding performed after the first welding performed on the first and second test members, wherein the undulation of the second member is calculated after the first welding is performed on the first member and the second member, and in performing the second welding, the welding start position in the circumferential direction is determined so that the welding displacement cancels out the undulation.

In the above double side welding method, preferably, the second welding to be performed after the first welding includes the heat amount adjustment to adjust the heat input amount with respect to the weld part so that welding distortion corresponding to a target distortion amount is generated.

In the above double side welding method, preferably, the first welding and the second welding both include the heat amount adjustment to adjust the heat input amount to the weld part so that the welding distortion corresponding to the target distortion amount is generated.

In the above double side welding method, preferably, the heat amount adjustment includes: preparing a first test member and a second test member respectively identical to the first member and the second member; determining the target distortion amount based on a result of welding distortion due to the first welding and the second welding performed on the first and second test members; and adjusting the heat input amount to the weld part to generate the welding distortion corresponding to the determined distortion amount.

In the above double side welding method, preferably, the first welding and the second welding are laser welding.

In the above double side welding method, preferably, the method uses the first member and the second member each of which has a joint shape to constitute a hollow space in a center portion of the weld part when seen in a welding direction of the first and second welding.

Effects of the Invention

In the present invention, the welding distortion generated by the first welding and the second welding are ascertained and, based on this, the heat amount adjustment is performed to adjust a heat input amount to the weld part so that welding distortion with a target distortion amount is generated, or, a welding start position in a circumferential direction is determined to cancel out undulation by weld displacement occurring in the circumferential direction. Positively utilizing the welding distortion enables for example adjustment of an end face of a ring gear close to a reference position. Thus, product accuracy can be improved.

REFERENCE SIGNS LIST

1 Ring gear
2 Gear case
5 Weld part
23 Hollow
111, 112 End face

MODE FOR CARRYING OUT THE INVENTION

Figure 1:
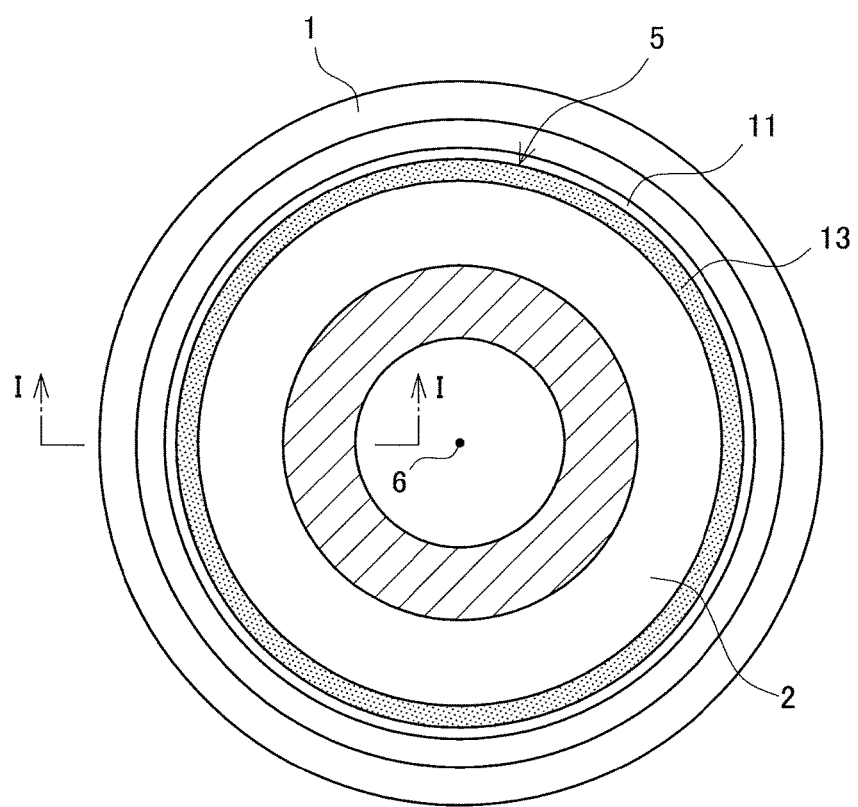
FIG. 1 is a plan view showing a ring gear and a gear case after welding.
Figure 2:
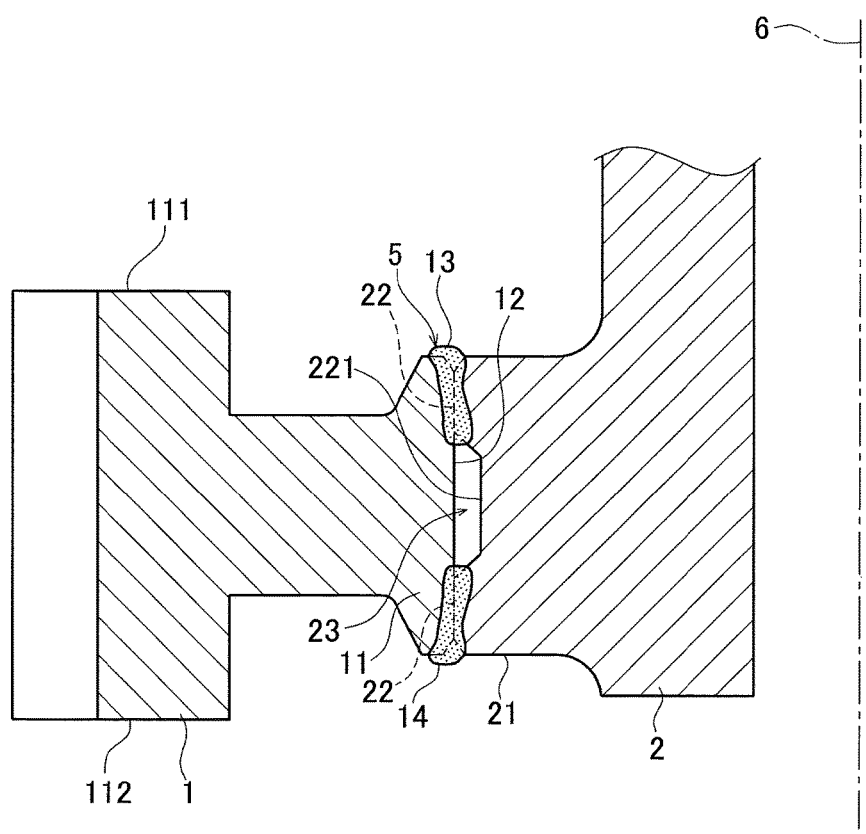
FIG. 2 is an enlarged sectional view of a weld part of the ring gear and the gear case, taken along a line I-I in FIG. 1.

A detailed description of a preferred embodiment of a double side welding embodying the present invention will now be given referring to the accompanying drawings. The present embodiment describes an example of joining components to be welded by laser, that is, a gear case and a ring gear, to constitute a differential gear. FIG. 1 is a plan view showing a ring gear 1 and a gear case 2 after welding. The gear case 2 is illustrated by only a part joined to the ring gear 1. FIG. 2 is an enlarged sectional view of a weld part of the ring gear 1 and the gear case taken along a line I-I in FIG. 1.

The gear case 2 is formed with a circular flange 21 protruding outward over the entire circumference. The ring gear 1 is formed with a fit portion 11 fitted on the flange 21. The ring gear 1 is fitted on the gear case 2 in such a manner that the flange 21 is press-fitted in the fit portion 11. In the ring gear 1 and the gear case 2 after press-fitting, an area in which peripheral surfaces of the fit portion 11 and the flange 21 are in abutting relation in a radial direction is referred to as a weld part 5. Thus, the weld part 5 has an abutting joint shape. The weld part 5 with the abutted peripheral surfaces is subjected to laser welding over the entire circumference thereof.

The laser welding is conducted in a welding direction along a rotary shaft 6 indicated by a chain line in FIG. 2. In double side welding, the weld part 5 is irradiated by laser beam from each side in a thickness direction of the ring gear 1. The following explanation is made considering an axial direction of the ring gear 1 to be a vertical direction. The weld part 5 of the ring gear 1 and the gear case 2 is annular when seen from above or below. The laser beam is continuously irradiated to the weld part 5. Thus, the weld part 5 after laser welding is formed with circular weld beads 13 as shown in FIG. 1. The weld part 5 is also subjected to laser welding on the opposite side and formed with circular weld beads 14 as shown in FIG. 2.

In the double side welding in the present embodiment, meanwhile, the weld part 5 is irradiated by the laser beam from each of the upper and lower sides as described above, not only from one side, to be welded. This is because if the laser beam is irradiated from only one side to weld the weld part 5, a heat input amount is different between an irradiated side and an unirradiated side, thereby causing large welding distortion in the weld part 5. The welding distortion thus may remarkably decrease tooth-surface accuracy of the ring gear 1. Therefore, double side welding is adopted to irradiate the laser beam to the weld part 5 from each side in the vertical direction to avoid deviation in heat input amount.

The weld part 5 of the ring gear 1 and the gear case 2 has the joint shape as shown in FIG. 2. An inner peripheral surface 12 of the fit portion 11 is flat in the vertical direction, while an outer peripheral surface 22 of the flange 21 is formed with an annular groove 221 in the center in the vertical direction. Accordingly, the weld part 5 is formed so that welding portions of the inner peripheral surface 12 and the outer peripheral surface 22 placed in abutting relation are divided into upper and lower parts relative to a hollow space 23 defined by the annular groove 221. In the laser welding of the present embodiment, penetration welding is continued until the laser beam irradiated from each of the upper and lower sides reaches the hollow space 23. The hollow space 23 is configured to avoid the weld part 5 from becoming melted deeply any more, irrespective of heat input amount. Thus, in the case of both side welding, the weld part 5 is melted by a predetermined depth from above and below, taking a balance, so that weld strength and quality can be enhanced.

Figure 3:
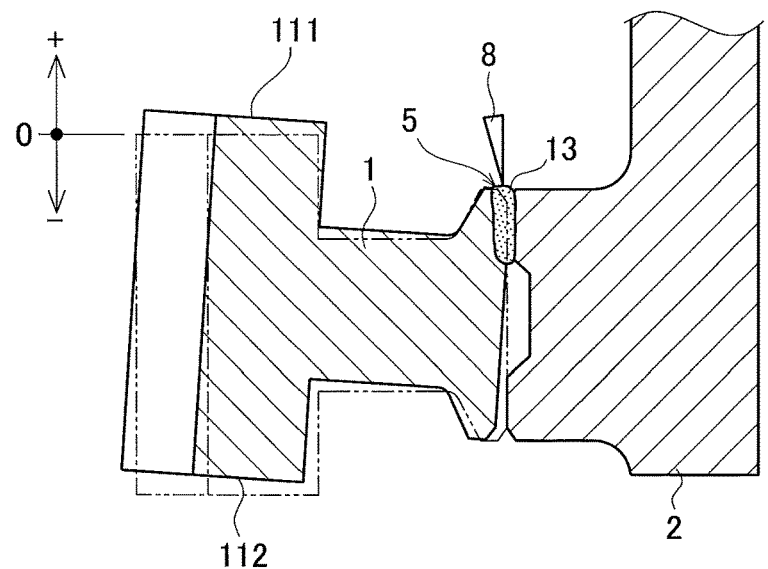
FIG. 3 is a conceptual diagram showing a state of welding distortion generated by first welding.
Figure 4:
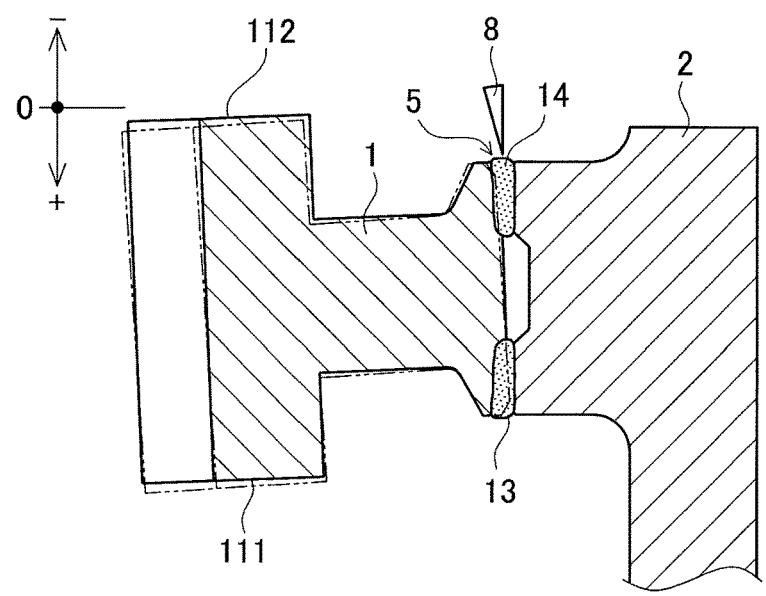
FIG. 4 is a conceptual diagram showing a state of welding distortion generated by second welding.

However, even in the double side welding adopting the above joint shape, the welding distortion is caused, resulting in a decrease in tooth-surface accuracy. The present inventors therefore conceived positive utilization of welding distortion generated by double side welding to enhance product accuracy. Thus, the welding distortion generated by laser welding is first measured. FIGS. 3 and 4 are conceptual diagrams showing a state of welding distortion generated by laser welding. This measurement of welding distortion is conducted on the state of the ring gear 1. To be concrete, displacement of end faces 111 and 112 of the ring gear 1 in the vertical direction are measured. In each figure, the position indicated by 0 (zero) corresponds to a position defined as a reference (a reference position) of the end faces 111 and 112. It is measured to what extent the end faces 111 and 112 are displaced from the reference position in the vertical direction. For this measurement, for example, a measuring device using a laser beam is employed.

In the double side welding, as shown in FIG. 3, first welding is performed first to irradiate a laser beam 8 from the end face 111 side. The weld part 5 irradiated by the laser beam 8 is melted in the end face 111 side and welded on one side in the vertical direction. This welding deforms the ring gear 1 to a side formed with the weld beads 13, thereby causing welding distortion that the end face 111 is displaced from the reference position indicated by a chain line to a position indicated by a solid line. This is referred to as a first welding distortion. Thereafter, the ring gear 1 and the gear case 2 are turned upside down and subjected to a second welding by irradiating a laser beam 8 from the end face 112 side as shown in FIG. 4. By this second welding, the weld part 5 on the end face 112 side is welded. The second welding similarly deforms the ring gear 1 to a side formed with the weld beads 14, thereby causing welding distortion that the end face 111 is displaced from the position with the first welding distortion indicated by a chain line to a position indicated by a solid line. This is referred to as a second welding distortion.

When the double side welding method is carried out by performing laser welding from each side in the vertical direction, the first welding distortion and the second welding distortion are caused after respective welding operations. It is found that the first welding distortion and the second welding distortion occur in vertically opposite directions, so that they cancel each other out. Therefore, such a relation of welding distortion is further measured by various patterns. For instance, the measurement is made on a ring gear 1 and a gear case 2 having a joint shape different from the above joint shape. However, this joint shape, similarly to the above, is formed with a hollow space whereby providing separated upper and lower melted portions. For instance, conceivable configurations are that a center portion is formed in abutting relation and double annular grooves are formed above and below the center portion, that both of peripheral surfaces in abutting relation are formed each with an annular groove to provide a large volume hollow space.

Furthermore, the measurement is also made by changing welding conditions as well as the joint shape. Changing of the welding conditions includes for example the presence/absence of temporary fitting, and changes in laser output size and in welding speed. For the present measurement, double side welding of the ring gear 1 and the gear case 2 is performed using eleven welding patterns different in joint shape and welding condition and then the distortion amounts of end faces 111 and 112 due to welding distortion are measured. This result reveals that the distortion amounts depend on the welding patterns, but the first welding distortion and the second welding distortion are caused in opposite directions in every welding pattern. It is further found that the patterns are different in degree of distortion amount between the first welding distortion and the second welding distortion.

Figure 5:
FIG. 5 is a diagram showing positions of end faces in the first welding and the second welding.

Herein, FIG. 5 is a diagram showing positions of the end faces 111 and 112 in the first welding and the second welding. In the light of a relationship between the first welding distortion and the second welding distortion, the results obtained in the double side welding in the eleven patterns are roughly divided into two patterns shown in FIG. 5. One example of the two patterns is shown with line graphs 201 and 202 in FIG. 5. The line graph 201 depicts a type that the distortion amount of the first welding distortion is larger than that of the second welding distortion. On the other hand, the line graph 202 depicts a type that the distortion amount of the second welding distortion is larger than that of the first welding distortion. It is to be noted that the position of each of the end faces 111 and 112 in the first welding and the second welding shown in FIG. 5 are the distance from the reference position and defined by an average value over the entire circumference of each end face 111 and 112.

Therefore, the present inventors conceived from the measurement results indicated by the above line graphs 201 and 202 that controlling the welding distortion in the laser welding is effective in improving the tooth-surface accuracy of the differential gear. Specifically, they thought about bringing the positions of the end faces 111 and 112 of the ring gear 1 to the reference position 0 by welding distortion. For this purpose, the distortion amounts of the first welding distortion and the second welding distortion occurring in the vertical opposite directions are controlled so that each of the end faces 111 and 112 of the ring gear 1 distorted and displaced once is returned to the reference position.

In the double side welding, even if the first welding distortion is caused by the first welding first performed, the second welding distortion generated in the opposite direction in the second welding cancels out the displacement in the vertical direction. Accordingly, in the ring gear 1, even when the positions of the end faces 111 and 112 in the vertical direction are displaced from the reference position 0 by the first welding, they can be returned to the reference position 0 again by the second welding. However, from checking of the welding distortion in each measured welding pattern, it is found that the distortion amounts are different from pattern to pattern. Accordingly, if the first welding and the second welding are simply performed, the displacement from the reference position 0 occurs as shown in FIG. 5 at the time when the second welding is terminated.

For performing the double side welding, heretofore, it is controlled that the weld depth of each weld beads 13 and 14 is set to a fixed value to ensure welding strength. This control does not take into account the influence of the distortion amounts of the first welding distortion and the second welding distortion on improvement of tooth-surface accuracy. Therefore, hereinafter, the double side welding method is first configured such that the heat input amount to the weld part 5 is controlled to adjust the distortion amount of welding distortion to improve the tooth-surface accuracy. At that time, the heat input amount is determined enough to obtain a fixed weld depth to ensure welding strength and further the heat input amount is adjusted to obtain a target distortion amount of welding distortion.

(First Embodiment)

Figure 6:
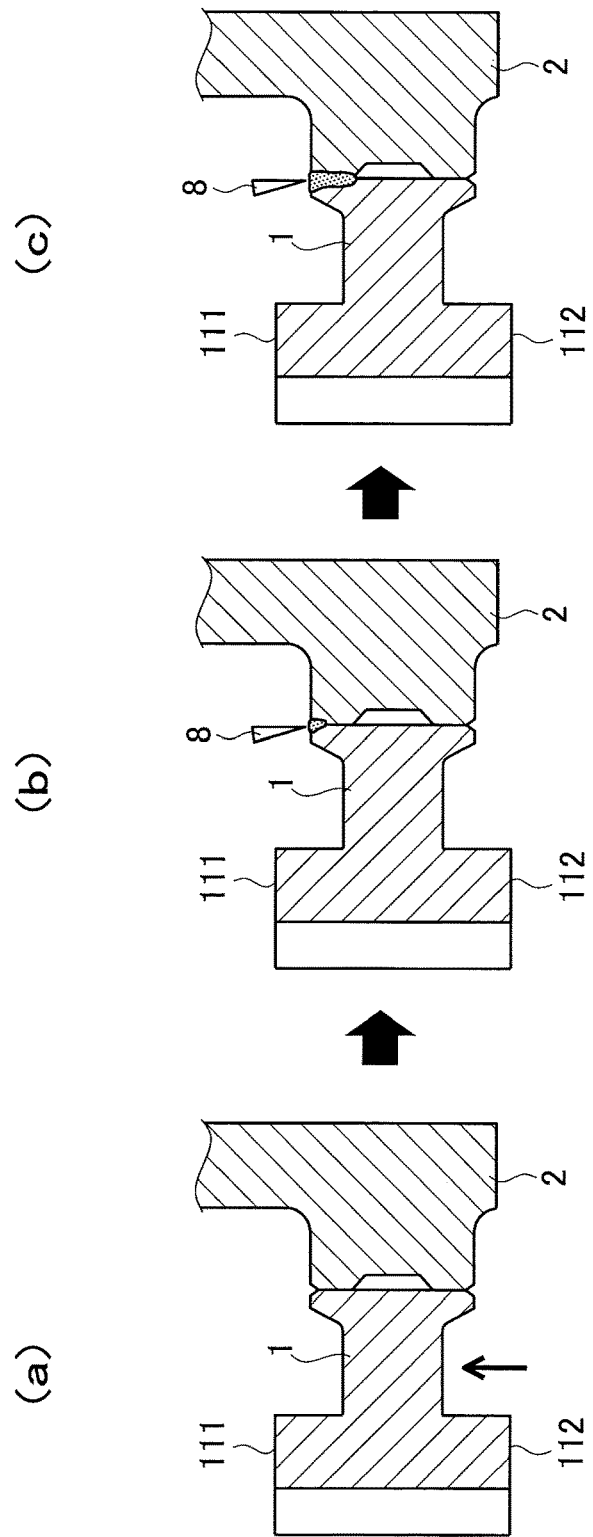
FIG. 6 is a diagram showing a first welding process of double side welding performed to the ring gear and the gear case.
Figure 7:
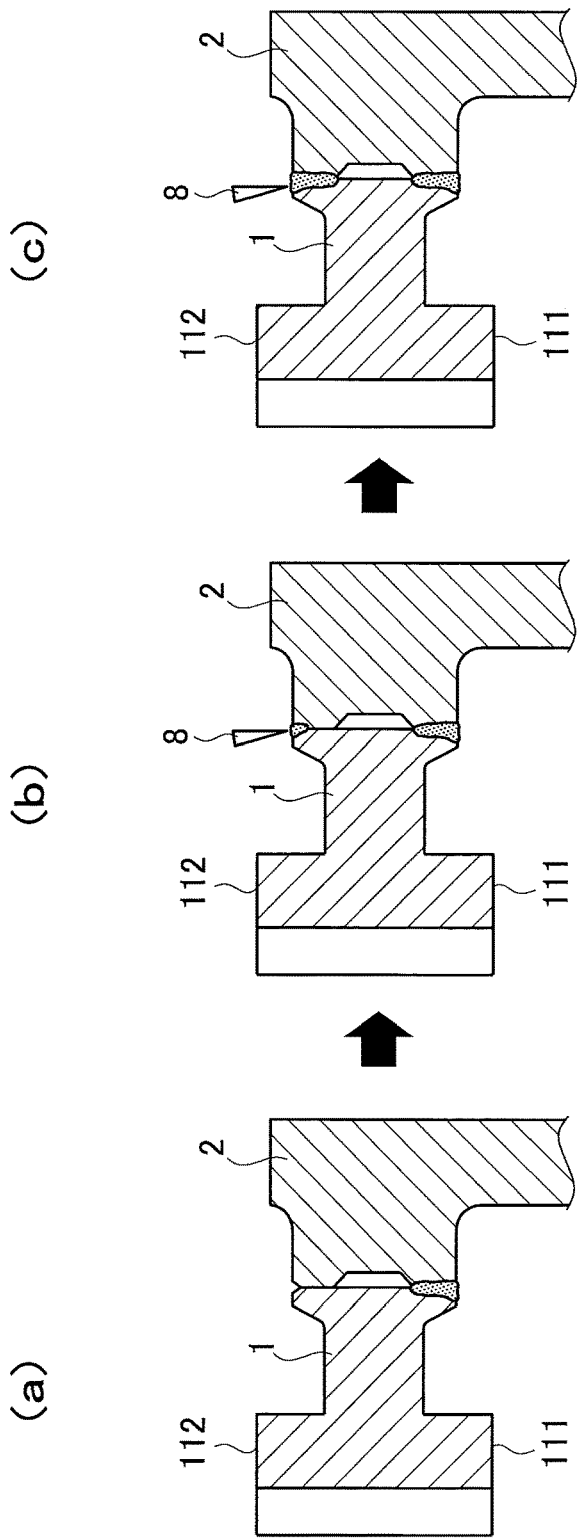
FIG. 7 is a diagram showing a second welding process of the double side welding performed to the ring gear and the gear case.

FIGS. 6 and 7 are diagrams showing processes of the double side welding performed on the ring gear 1 and the gear case 2. Specifically, FIG. 6 shows a first welding process and FIG. 7 shows a second welding process. Firstly, the ring gear 1 is fitted onto the fixed gear case 2 from below as indicated by an arrow in FIG. 6(a). Specifically, this fitting operation is performed so that the flange 21 is press fitted in the fit portion 11 of the ring gear 1. Then, temporary fitting shown in FIG. 6(b) is performed. In this temporary fitting, the laser beam 8 is irradiated over the entire circumference of the weld part 5. At that time, a laser welding device 30 shown in FIG. 8 controls laser output, welding speed, and others to provide a weld depth of 1 mm. Subsequently, main welding shown in FIG. 6(c) is conducted. In this main welding, the laser beam 8 is irradiated over the portion of the weld part 5 irradiated in the temporary fitting along the entire circumference and simultaneously a welding wire not shown is melted therein. In the main welding, laser output, welding speed, and others of the laser welding device is controlled to provide a weld depth of 3 mm.

After the first welding is performed on the end face 111 side of the ring gear 1, the ring gear 1 and the gear case 2 are turned upside down as shown in FIG. 7(a). Accordingly, the end face 112 side of the ring gear 1 is placed toward the laser welding device 30 located above. Then, temporary fitting shown in FIG. 7(b) is performed. In this temporary fitting, similarly, the laser beam 8 is irradiated over the entire circumference of the weld part 5 to provide a weld depth of 1 mm. Subsequently, main welding shown in FIG. 7(c) is conducted. In this main welding, the laser beam 8 is irradiated over the portion of the weld part 5 irradiated in the temporary fitting along the entire circumference thereof and also a welding wire not shown is melted therein. In this main welding, similarly, laser output, welding speed, and others of the laser welding device is controlled to provide a weld depth of 3 mm. On the end face 112 side, accordingly, the welding depth of 3 mm is achieved in the second welding. This weld depth of the weld part 5 is also 3 mm by the presence of the hollow space 23.

Figure 8:
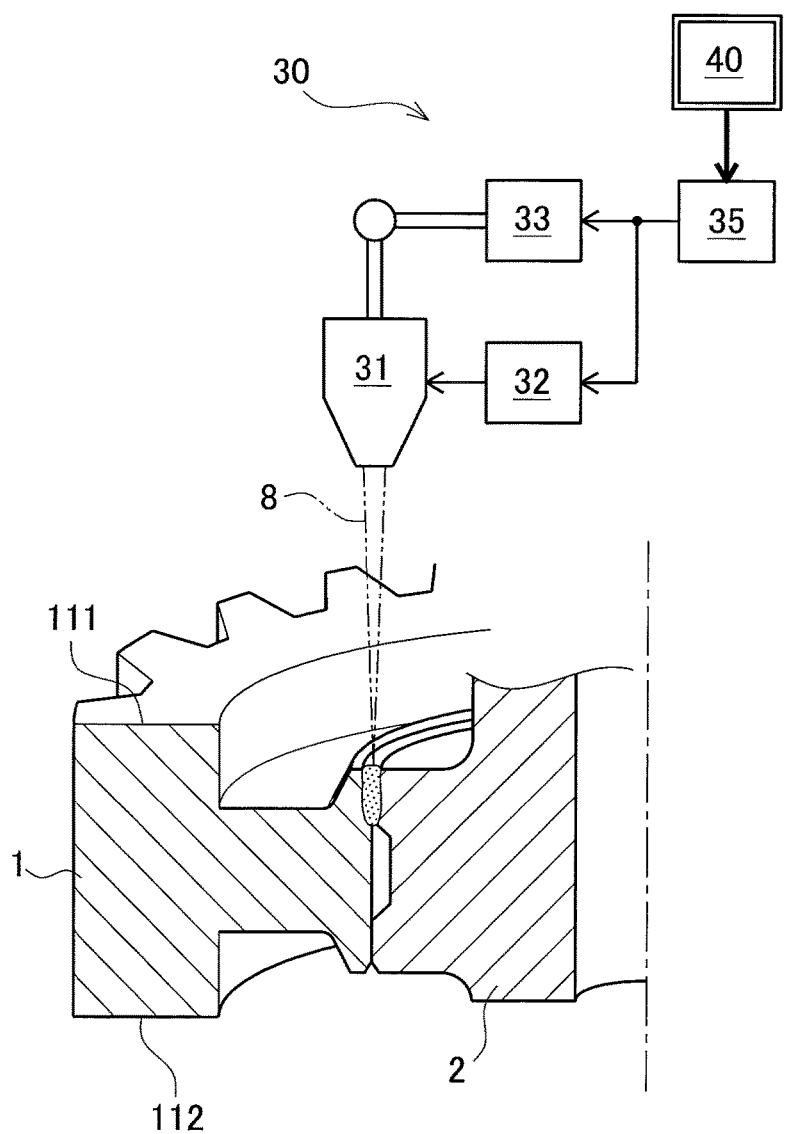
FIG. 8 is a conceptual diagram showing a laser welding device.

In the present embodiment, the double side welding explained above is carried out by the laser welding device shown in FIG. 8. The same applies to each of the following embodiments. FIG. 8 is a conceptual diagram showing the laser welding device. The laser welding device 3 includes a laser head 31 to irradiate a laser beam to the weld part 5. To the laser head 30, the laser beam is delivered from a laser oscillator 32. An operation mechanism 33 is configured to move an irradiating position and change an irradiating angle of the laser beam. The laser oscillator 32 and the operation mechanism 33 are connected to a controller that individually drives and controls them. The controller 35 includes a storage part for storing information to perform the aforementioned welding to the weld part 5, a computing part for calculating a heat input amount leading to a target distortion amount and a control value thereof, and others.

The controller 35 is connected to a measuring device 40. This measuring device 40 is configured to measure the position of the end face 111, 112 of the ring gear 1 by the laser beam and transmit measurement data to the controller 35. In the present embodiment, setting conditions such as the laser output and the welding speed are changed based on the measurement result of the measuring device 40 to adjust the heat input amount. The controller 35 is storing a control program for changing the setting conditions based on the measurement data transmitted from the measuring device 40 and the information directly input to the controller 35 and controlling the laser oscillator 32 and the operation mechanism 33.

In the present embodiment, firstly, the tendency of welding distortion is checked prior to mass production. In other words, a test ring gear 1 and a test gear case 2 identical to those for mass production are subjected to the double side welding under a predetermined condition. The distortion amount of welding distortion with respect to the heat input amount is measured. Specifically, the laser welding device 30 is driven under the predetermined setting condition (initial setting). The measuring device 40 measures the welding distortion when the ring gear 1 and the gear case 2 welded to each other. After each of the first welding and the second welding shown in FIGS. 6(c) and 7(c), the end faces 111 and 112 of the ring gear 1 are displaced due to the welding distortion as shown in FIGS. 3 and 4. This displacement amount is measured by the measuring device 40 over the entire circumference. The measurement is also performed similarly on the end face 111 just after press fitting shown in FIG. 6(a).

Based on the measurement result, control setting for actually producing a differential gear is made. For instance, in the case of the line graph 201 type shown in FIG. 5, the control setting is changed to increase the distortion amount of the second welding distortion. Thus, the control setting is changed to increase the heat input amount in the second welding so that the distortion amount of the second welding distortion is equal to the distortion amount of the first welding distortion. To the contrary, in the case of the line graph 202 type shown in FIG. 5, the distortion amount of the first welding distortion has to be increased. The control setting is thus changed to increase the heat input amount in the first welding so that the distortion amount of the first welding distortion is equal to the distortion amount of the second welding distortion. Consequently, the first welding distortion and the second welding distortion equal in distortion amount cancel each other out, thereby enabling the position of each of the end faces 111 and 112 to be adjusted to the reference position.

The measurement data from the measuring device 40 is stored in the controller 35. Based on this measurement result, the heat input amount during the first welding or second welding is increased. To be concrete, the controller 35 changes settings of laser output value and welding speed according to the heat input amount for the target distortion amount. By changing the heat input amounts as above, the distortion amounts in the first welding and the second welding are made equal to each other. In producing the differential gear, the controller 35 having made the control setting of the predetermined heat input amount executes the double side welding of the ring gear 1 and the gear case 2 shown in FIGS. 6 and 7. Since the distortion amounts in the first welding and the second welding are equal, the end faces 111 and 112 of the ring gear 1 displaced once by the first welding distortion are returned to the reference position 0 by the second welding distortion. Thus, a differential gear with good tooth-surface accuracy is produced.

Meanwhile, in the double side welding of the ring gear 1 and the gear case 2, the weld depth on each side is set to 3 mm to ensure welding strength. Accordingly, if the weld depth of 3 mm is obtained, the control setting may be changed to decrease the heat input amount in reverse fashion from the above. In the case where the welding distortion of the ring gear 1 and the gear case 2 is represented by the line graph 201 type, the distortion amount of the first welding distortion is decreased to become equal to the distortion amount of the second welding distortion. In the case where the welding distortion is represented by the line graph 202 type, on the other hand, the distortion amount of the second welding distortion is decreased to become equal to the distortion amount of the first welding distortion. In the controller 35, accordingly, the control setting is changed to enable laser welding at the heat input amount leading to the target distortion amount. In this case, similarly, the distortion amounts of the first welding and the second welding are equal, so that each of the end faces 111 and 112 after welding is returned to the reference position 0. Thus, a differential gear with good tooth-surface accuracy is produced.

The above explanation is given to the case where the heat input amount is adjusted in one of the first welding and the second welding based on the measurement result. However, increasing/decreasing the heat input amount may be adjusted in consideration of both of the first welding and the second welding. For instance, there is a case where the position of the end faces 111 and 112 are already displaced from the reference position 0 just after press fitting shown in FIG. 6(a). In such a case, the heat input amount is adjusted in both the first welding and the second welding. Therefore, the distortion amount is determined in both of the first welding and the second welding and control settings are changed to enable laser welding at the heat input amount for the target distortion amount. Furthermore, the control setting of the heat input amount may be changed so as to be constant in the first welding and the second welding based on an average value of the distortion amounts as shown in FIG. 5 or changed so as to be segmentalized in a circumferential direction of the annular weld part 5.

In the present embodiment, the target distortion amount of the first welding distortion or the second welding distortion is determined and the heat input amount is accordingly controlled to perform laser welding. Therefore, the first and second welding distortions equal in distortion amount cancel each other out, thereby reducing the entire welding distortion in the double side welding. To be concrete, the positions of the end faces 111 and 112 of the ring gear 1 can be adjusted close to the reference position shown in FIGS. 3 and 4. Consequently, the double side welding method of the present embodiment is executed to improve the tooth-surface accuracy of the differential gear.

(Second Embodiment)

In the aforementioned first embodiment, the control setting of the laser welding device 30 are determined based on the measurement results of the position displacement of each end face 111 and 112 measured in advance. The second embodiment is similar to the first embodiment in that the laser welding device 30 is controlled by use of such measurement results. However, the second embodiment is characterized in that the laser welding device 30 is controlled based on measurement data of the ring gear 1 obtained during welding, that is, so-called feedforward control is executed. Also in the present embodiment, the measuring device 40 using a laser beam is used for measurement.

The double side welding method of the present embodiment includes, as in the first embodiment, the first welding and the second welding shown in FIGS. 6 and 7. In production of differential gears, in the first and second welding processes shown in FIGS. 6(c) and 7(c), displacements of the end faces 111 and 112 are measured respectively by the measuring device 40 at the same time with respective welding. Accordingly, measurement data from the measuring device 40 is constantly transmitted to the controller 35 during laser welding. The controller 35 calculates a target distortion amount based on the measurement results, and further calculates a heat input amount for laser welding to be performed following a measured site. In the laser welding device 30, therefore, the laser oscillator 32 and the operation mechanism 33 are driven and controlled according to the heat input amount, thereby appropriately adjusting laser output and welding speed.

Figure 9:
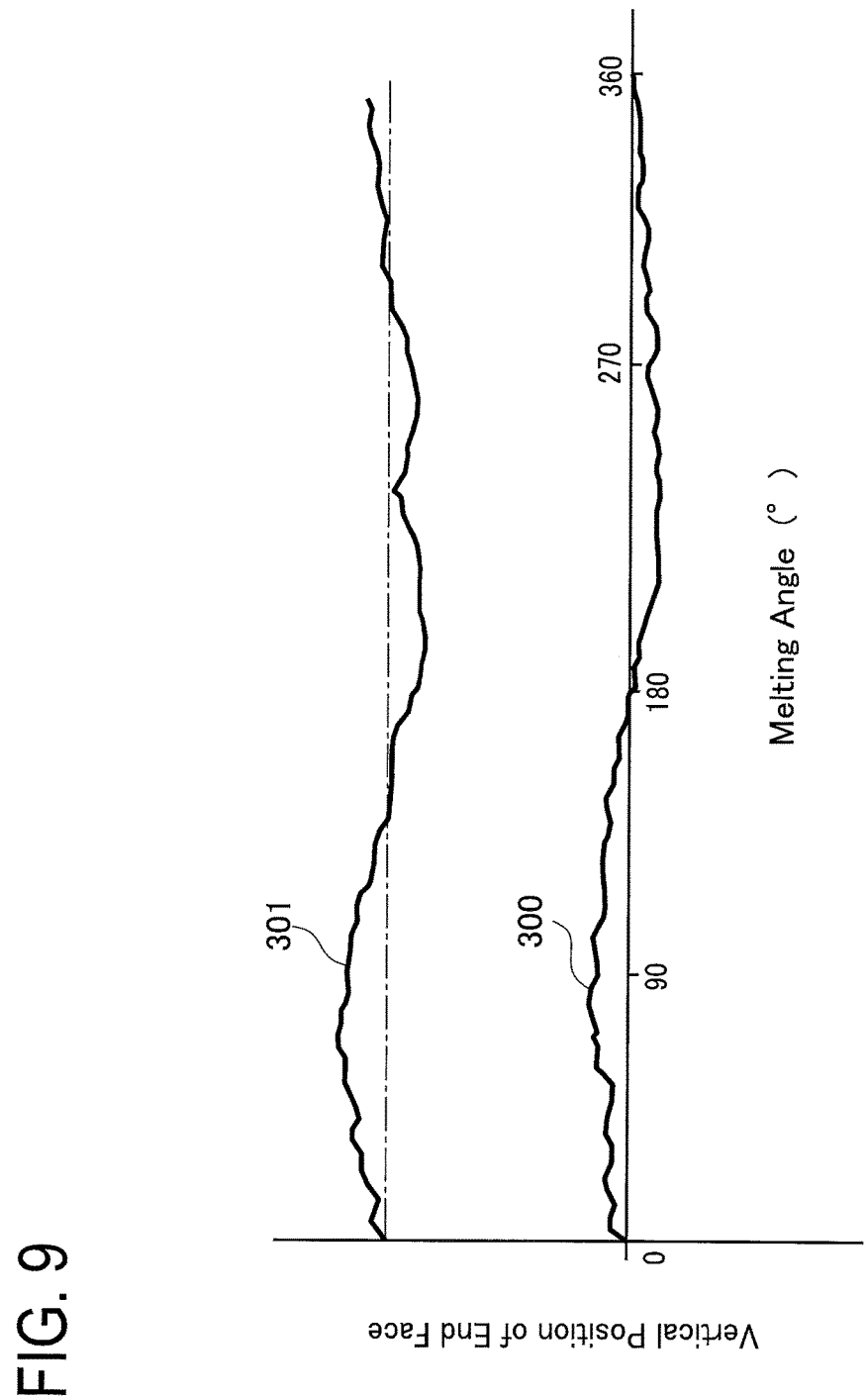
FIG. 9 is a chart showing a position of an end face of a ring gear in a vertical direction over an entire circumference.

From the measurement results of the measuring device 40, it is detected to what extent the end faces 111 and 112 are being displaced before welding in the vertical direction as shown in FIG. 9. Herein, FIG. 9 is a chart showing the positions of the end faces 111 and 112 in the vertical direction over the entire circumference. For example, 0° is a welding start position. In this chart, a line graph 300 depicts the position of the end face 111 measured before the first welding, that is, after press fitting, and a line graph 301 depicts the position of the end face 112 measured before the second welding, that is, displaced by the first welding distortion. The value 0 represents the reference position. Accordingly, the controller 35 determines a target distortion amount based on the line graph 300 or 301, and calculates the heat input amount whereby the corresponding welding distortion is caused, and drives and controls the laser oscillator 32 and the operation mechanism 33.

The present embodiment includes a first example in which only the second welding shown in FIG. 7(c) is subjected to the feedforward control and a second example in which both the first welding shown in FIG. 6(c) and the second welding shown in FIG. 7(c) are subjected to the feedforward control. In the first example, accordingly, only the distortion amount due to the first welding (the line graph 301) is detected to adjust the distortion amount of the second welding distortion. Specifically, in the second welding, the position of the end face 112 is measured by the measuring device 40 in advance of a welding position to which a laser beam 8 is to be irradiated. The measurement data shown by the line graph 301 is input to the controller 35.

The controller 35 calculates the heat input amount to obtain a target distortion amount whereby the position of the end face 112 returns to the reference position 0, and drives and controls the laser oscillator 32 and the operation mechanism 33. In the second welding, therefore, the laser output of the laser beam 8 is increased/decreased and the welding speed is changed to adjust the heat input amount in each welding site of the weld part 5. By this second welding, the end faces 111 and 112 of the ring gear 1 are returned to the reference position 0 shown in FIGS. 3 and 4. A differential gear with good tooth-surface accuracy is thus produced. In this case, in the first welding, the control setting may be determined to increase/decrease the heat input amount based on the initial settings or based on the previously measured results as in the first embodiment.

In the second example, welding distortion is adjusted in both the first welding and second welding processes. In the first welding process, specifically, the position of the end face 111 is measured by the measuring device 40, and the measurement data depicted by the line graph 300 is input to the controller 35 in advance of each welding site. The controller 35 increases/decreases the heat input amount of the initial setting for example according to a displacement amount of the line graph 300 from the reference position 0, thereby drives and controls the laser oscillator 32 and the operation mechanism 33. In the second welding process, similarly, the position of the end face 112 is measured by the measuring device 40, and the measurement data depicted by the line graph 301 is input to the controller 35 in advance of each welding site. The controller 35 calculates the heat input amount to obtain a target distortion amount whereby the position of the end face 112 returns to the reference position 0, and drives and controls the laser oscillator 32 and the operation mechanism 33. In the first welding and the second welding explained as above, the end faces 111 and 112 of the ring gear 1 are adjusted close to the reference position shown in FIGS. 3 and 4.

In the present embodiment, consequently, the first welding distortion and the second welding distortion cancel each other out, so that the welding distortion throughout the entire double side welding can be reduced. In particular, the feedforward control for adjusting the heat input amount according to the states of the end faces 111 and 112 is performed. This enables laser welding with a more appropriate heat input amount. Accordingly, the end faces 111 and 112 of the ring gear 1 can be adjusted close to the reference position shown in FIGS. 3 and 4. The double side welding method of the present embodiment can produce the differential gear with enhanced tooth-surface accuracy.

(Third Embodiment)

In the first and second embodiments, the control setting of the laser welding device 30 is made after the target distortion amounts are determined based on the measurement results. In a third embodiment, similarly, the positions of the end faces 111 and 112 of the ring gear 1 in the vertical direction are measured and the measurement results thereof are utilized. In addition, the third embodiment a double side welding method in which undulation of the ring gear 1 seen in a circumferential direction is checked from the measurement results and the undulation is canceled by welding displacement caused by welding distortion. In the third embodiment, the double side welding is also conducted through the processes shown in FIGS. 6 and 7 as in the first embodiment.

Figure 10:
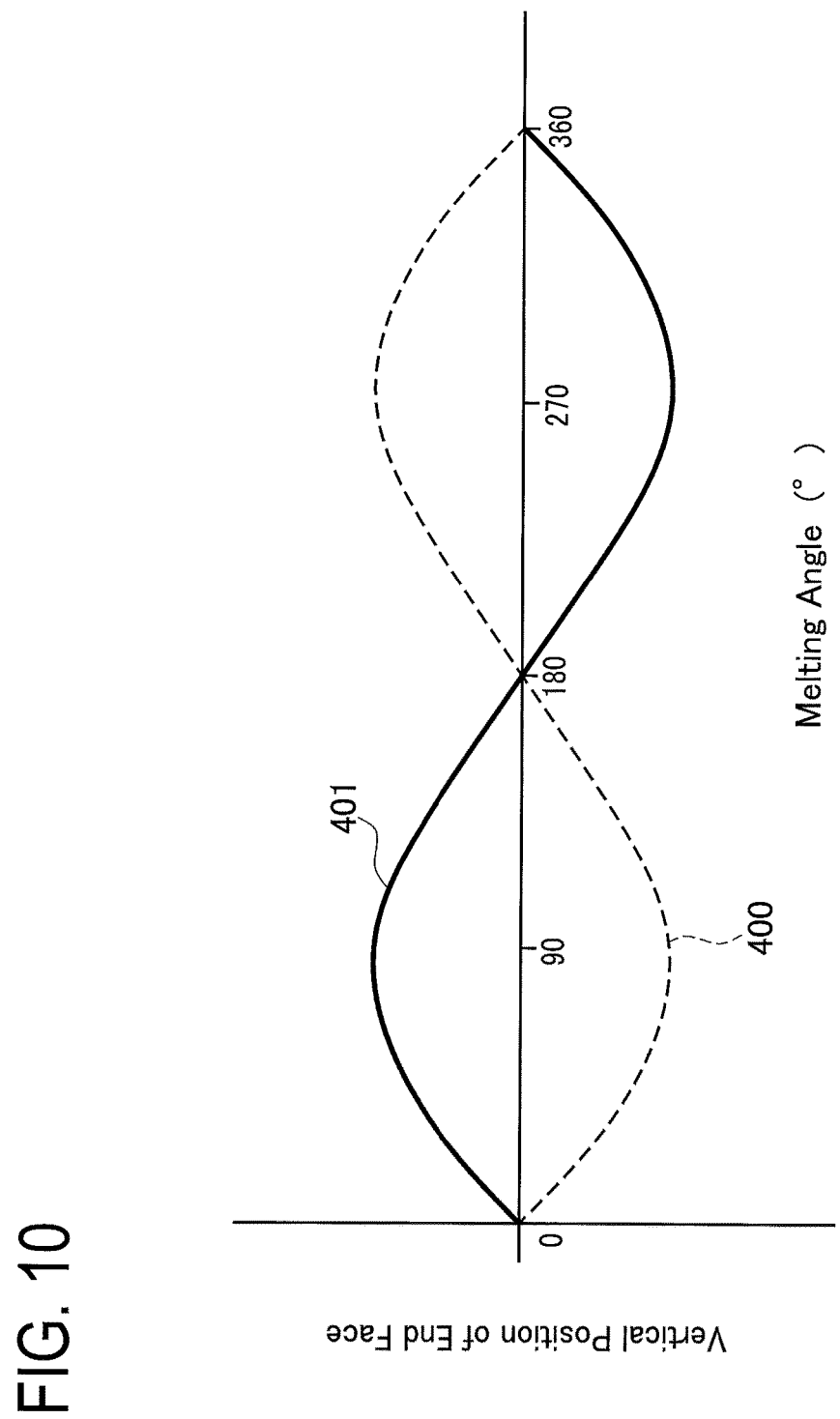
FIG. 10 is a conceptual diagram showing changes in end face of the ring gear in the circumferential direction.

From the measurement results of the end faces 111 and 112 of the ring gear 1, it is found that the end faces 111 and 112 are undulated due to the welding distortion. Specifically, from the measurement results of the positions of the end faces 111 and 112 measured respectively after the first welding of FIG. 6(c) and after the second welding of FIG. 7(c) over the entire circumference, it is found that a cyclic welding displacement 401 occurs as indicated by a solid line in FIG. 10. FIG. 10 is a conceptual diagram showing changes of the end faces 111 and 112 in the circumferential direction. It is to be noted that the undulation caused in the end face 111 due to welding distortion is referred to as a welding displacement.

The measurement results obtained in measurements performed two or more times under the same condition reveal that the welding displacement in each case exhibits the same tendency. The reason why the welding displacement occurs is that a start site and an end site of laser welding performed over the entire circumference partially overlap one on the other, and the heat input amount on such an overlapping site is larger than on other sites, generating tensile stress. The welding displacement 401 in FIG. 10 shows a combination of the first welding distortion and the second welding distortion. However, such a welding displacement also appears in each of the first welding distortion and the second welding distortion. For example, a concrete welding displacement due to the first welding distortion appears in the line graph 301 in FIG. 9.

The undulation of each end face 111 and 112 also exists in the ring gear 1 itself before welding. This results from the lower rigidity of the ring gear 1 than that of a conventional ring gear. Specifically, the conventional differential gear adopts a bolt fastening method and accordingly the ring gear is designed with a small inner diameter. In contrast, the ring gear 1 joined by laser welding or the like is designed with a large inner diameter, resulting in low rigidity. Thus, the ring gear 1 is deformed by heat treatment for hardening and is undulated. When the end face 111 is measured at a stage before welding shown in FIG. 6(a), conceptually, undulation 400 occurs as indicated by a broken line in FIG. 10. To be concrete, this undulation also appears in the line graph 300 depicted in FIG. 9. Since the ring gear 1 subjected to hardening as above is undulating, a ring gear not subjected to heat treatment is used in the above measurement of welding displacement.

In the present embodiment, the start position of laser welding is determined in consideration of the above undulation 400 and welding displacement 401. Specifically, by the welding displacement 401 caused by the first welding and the second welding, the undulation 400 existing in the ring gear 1 before welding is canceled out. For this purpose, for mass production of differential gears, a test ring gear 1 and a test gear case 2 are first subjected to the double side welding. During the process of performing the double side welding, the measuring device 40 measures the end faces 111 and 112. This measurement is performed just after press fitting in FIG. 6(a), after the first welding in FIG. 6(c), and after the second welding in FIG. 7(c).

The measurement data is transmitted from the measuring device 40 to the controller 35. Based on the measurement result, the controller 35 calculates the undulation 400 and the welding displacement 401. Actually, the undulation 400 generated in the ring gear 1 before welding and the welding displacement 401 generated by welding do not always exhibit the same waveform as each other as shown in FIG. 10. However, conceptually, the waveform of the welding displacement 401 is overlapped with the waveform of the undulation 400 with a phase shift therefrom, cancelling the displacement in the vertical direction, so that the position of the end face 111 can be adjusted close to the reference position 0.

In production of differential gears, the displacement of the end face 111 is measured by the measuring device 40 just after press fitting in FIG. 6(a). This measurement result is transmitted from the measuring device 40 to the controller 35 in which the undulation of the end face 111 is calculated. The controller 35 determines the position corresponding to 0° in FIG. 10 from the annular weld part 5 shown in FIG. 1 based on the undulation 400 of the end face 111. This determined position is defined as a start position. In the first welding and the second welding, a laser beam is irradiated from the start position.

FIG. 10 shows a case where the welding displacement 401 resulting from a combination of the first welding distortion and the second welding distortion cancels the undulation 400. However, in the first welding and the second welding, the start position of laser irradiation is not necessarily made coincident. For instance, when the welding displacement 401 is to be obtained, measurement is made in various patterns such as where the start positions of the first welding and the second welding are coincident and where the phases are shifted. The pattern of welding displacement 401 in every case is obtained. The controller 35 stores a plurality of patterns of the welding displacement 401 and respective start positions. In the case where the double side welding is actually performed, an optimal pattern to cancel the undulation 400 is selected and the start position of each of the first welding and the second welding is determined.

On the other hand, the welding displacement 401 may be determined only by the second welding distortion. In this case, the undulation of the end face 1112 is measured after the first welding and before the second welding. From the waveform thereof, the start position of the second welding to cancel the undulation of the ring gear 1 is calculated. According to this method, a state additionally including a welding displacement caused by the first welding distortion is defined as the undulation 400. The welding displacement 401 due to the second welding distortion is added to the undulation 400, thereby cancelling out the displacement in the vertical direction, so that the position of the end face 111 is brought close to the reference position 0.

In the present embodiment, the welding is started at a position determined so that the undulation 400 measured before welding is canceled by the welding displacement 401. Therefore, the joined ring gear 1 can have the end faces 111 and 112 whose undulation was corrected. Thus, a differential gear can achieve enhanced tooth-surface accuracy.

(Fourth Embodiment)

In the method of the above third embodiment, the welding start position is controlled to cancel the undulation of the ring gear 1. In the present embodiment, on the other hand, the undulation of the ring gear 1 is canceled and also the heat input amount is adjusted as described in the first and second embodiments, the first welding distortion and the second welding distortion cancel each other out to reduce welding distortion throughout the entire double side welding. Specifically, this method corresponds to a combination of the first and third embodiments and to a combination of the second and third embodiments.

In the present embodiment, for mass production of differential gears, the tendency of welding distortion and undulation is first checked. In other words, a test ring gear 1 and a test gear case 2 are subjected to the double side welding under a predetermined condition and the end faces 111 and 112 are measured by the measuring device 40. From the measurement results, in a similar manner to the first to third embodiments, the undulation and the welding displacement as well as the distortion amount of the welding distortion to the heat input amount are calculated.

In the double side welding method of the present embodiment, the first welding and the second welding shown in FIGS. 6 and 7 are performed. Therefore, as described in the first embodiment, the heat input amount in each of the first welding and the second welding to be performed in production of differential gears is calculated from the measurement results, and the controller 35 makes control setting. Then, the displacement of the end face 111 is measured by the measuring device 40 just after press fitting in FIG. 6(a) and the undulation 400 of the end face 111 shown in FIG. 10 is calculated. The controller 35 calculates the start position based on the undulation 400 as described in the third embodiment and the laser beam is irradiated from this position over the entire circumference.

On the other hand, it may be arranged as in the second embodiment such that the displacements of the end faces 111 and 112 are measured in production of differential gears and then the laser welding is performed by changing the heat input amount based on the measurement result thereof. In this case, as described in the third embodiment, the start position is calculated based on the undulation 400 and the laser beam is irradiated from the calculated position over the entire circumference.

In the present embodiment, as shown in FIG. 10, the undulation 400 measured before welding is canceled by the welding displacement 401, thereby correcting the undulations of the end faces 111 and 112. Further, the first welding distortion and the second welding distortion are canceled each other out, thereby reducing the welding distortion in the whole double side welding. Accordingly, the joined ring gear 1 can provide high tooth-surface accuracy in a differential gear.

The present invention is not limited to the above embodiments and may be embodied in other specific forms without departing from the essential characteristics thereof. In each of the above embodiments, for example, the ring gear 1 and the gear case 2 are used as one example of the members to be joined. As alternatives thereto, any other members may be adopted. Although the above embodiments explain the double side welding by laser welding, double side welding by arc welding or the like may be adopted. Regarding the methods in the first and second embodiments, furthermore, the weld part may be shaped to be linear, wavy or corrugated as well as to be annular as in the ring gear 1 and the gear case 2. The joint shape also is not limited to that in the above embodiments.

The invention claimed is:

1. A double side welding method for joining a first member and a second member being abutted against each other and connected by a weld part, the method including the steps of:
   producing a first test member and a second test member respectively identical to the first member and the second member,
   performing a first welding process from one side with respect to a weld part connecting the first and second test members and performing a second welding process, after the first welding process, on another side of said weld part connecting the first and second test members,
   modeling a target distortion amount for the first test member and the second test member based on a result of actual welding distortions of the first and second welding processes performed on the weld part connecting the first and second test members,
   adjusting a heat input amount to be applied to the weld part connecting the first and second members to generate a welding distortion corresponding to the modeled target distortion amount,
   performing the first welding process from one side with respect to the weld part connecting the first and second members,
   performing the second welding process from another side with respect to the weld part connecting the first and second members after the first welding process including the heat amount used to adjust a heat input amount with respect to the weld part connecting the first and second members so that welding distortion corresponding to the target distortion amount is generated.

2. The double side welding method according to claim 1, wherein the first member is a member provided with a circular protruding portion, the second member is an annular member in which the protruding portion is fitted, and peripheral surfaces of the first member and the second member in fitting relation are in abutting relation in a radial direction, forming the weld part.

3. The double side welding method according to claim 2, wherein a state measurement in the heat amount adjustment is performed on a position of an end face of the second member in an axial direction before welding over entire circumference.

4. The double side welding method according to claim 1, wherein:
   a first predetermined heat amount is applied to the first welding process from one side with respect to the weld part connecting the first and second members and
   a second predetermined heat amount is applied to the second welding process from another side with respect to the weld part connecting the first and second members to adjust the heat input amount to the weld part so that a cumulative welding distortion from the first welding process and the second welding process corresponding to a cumulative target distortion amount is generated.

5. The double side welding method according to claim 1, wherein when the welding distortion is targeted for the second member,
   in performing one or both of the first welding process and the second welding process with respect to the weld part connecting the first and second members, a heat amount adjustment includes:
   measuring a displacement of the second member before welding distortion is measured;
   determining the target distortion amount based on the measured displacement; and
   adjusting the heat input amount to the weld part to generate the welding distortion corresponding to the determined target distortion amount.

6. The double side welding method according to claim 1, wherein the first welding process and the second welding process are laser welding.

7. The double side welding method according to claim 1, wherein the method uses the first member and the second member each of which has a joint shape to constitute a hollow space in a center portion of the weld part when seen in a welding direction of the first and second welding processes.

8. A double side welding method for joining a first member provided with a circular protruding portion and an annular second member fitted on the protruding portion so that peripheral surfaces of the first member and the second member are in abutting relation in a radial direction, forming the weld part, the method including the steps of:
   producing a first test member and a second test member respectively identical to the first member and the second member;
   calculating undulation of the second test member;
   performing a first welding process from one side with respect to a weld part connecting the first and second test members and performing a second welding process, after the first welding process, on another side of said weld part connecting the first and second test members after said calculating;
   determining welding displacement based on a measurement result of a state of an end face of the second test member in an axial direction by a second welding process performed after performing the first welding process on the first and second test members;
   wherein undulation of the second test member is calculated after the first welding process is performed on the first test member and the second test member;

in performing the second welding process on the first and second test members, a welding start position in a circumferential direction is determined so that the welding displacement cancels out the undulation;

performing the first welding process from one side with respect to the weld part connecting the first and second members and performing the second welding process from another side with respect to the weld part connecting the first and second members, wherein the circumferential undulation in an end face of the second member in an axial direction is created with respect to the first member by performing the first welding process and the second welding process, wherein the welding displacement in the circumferential direction generated by deliberate welding distortion cancels out the circumferential undulation.

9. The double side welding method according to claim 8, wherein the second welding process performed after the first welding process with respect to the weld part connecting the first and second members includes a heat amount adjustment to adjust the heat input amount with respect to the weld part so that welding distortion corresponding to a target distortion amount is generated.

10. The double side welding method according to claim 9, wherein the heat amount adjustment includes: preparing a first test member and a second test member respectively identical to the first member and the second member; determining the target distortion amount based on a result of welding distortion due to the first welding process and the second welding process performed on the first and second test members; and adjusting the heat input amount to the weld part to generate the welding distortion corresponding to the determined distortion amount.

11. The double side welding method according to claim 8, wherein the first welding process and the second welding process with respect to the weld part connecting the first and second members both include a heat amount adjustment to adjust the heat input amount to the weld part so that the welding distortion corresponding to the target distortion amount is generated.

12. The double side welding method according to claim 8, wherein the first welding process and the second welding process are laser welding.

\* \* \* \* \*